Sept. 17, 1968 F. P. KOKESH 3,401,772
METHOD FOR LOGGING CASED BOREHOLES
Filed June 27, 1967 2 Sheets-Sheet 1

INVENTOR.
FRANK P. KOKESH
BY
his ATTORNEYS

United States Patent Office 3,401,772
Patented Sept. 17, 1968

3,401,772
METHOD FOR LOGGING CASED BOREHOLES
Frank P. Kokesh, Seabrook, Tex., assignor to Schlumberger Technology Corporation, Houston, Tex., a corporation of Texas
Continuation-in-part of application Ser. No. 534,310, Mar. 15, 1966. This application June 27, 1967, Ser. No. 653,299
6 Claims. (Cl. 181—.5)

ABSTRACT OF THE DISCLOSURE

A technique and apparatus for obtaining a log of the condition of the cement annulus between the casing and earth formations surrounding a borehole are described. An acoustic pulse is generated at a first point along the borehole and the acoustic energy reaching a second point therealong is converted into a corresponding electrical signal. The signal is filtered to remove low frequency components and gated to delete the early portion of the signal which includes direct compressional and shear wave transmission between the transmitting and reception points. The remainder of the signal, representative mainly of reverberatory energy in the liquid column, is integrated to give a measure of its energy content, which varies according to the presence or absence of hard cement or material around the casing between the two points. The resultant log, when correlated with a cement bond log, provides a full picture of the cement condition. The logging apparatus, including the filtering and gating arrangement, is described.

---

This application is a continuation-in-part of application Ser. No. 534,310, filed Mar. 15, 1966, now abandoned.

The present invention relates to methods and apparatus for logging cased boreholes and, more particularly, to methods and apparatus for obtaining information relative to the existence and quality of the cement annulus surrounding the casing in a borehole.

After a borehole drilled in the earth formation has been found to have penetrated a hydrocarbon bearing strata, the hole is generally cased with lengths of pipe, usually of steel, suitably coupled together. The casing is then cemented in place in the borehole, the cement being pumped in slurry form into the annulus between the casing and the surrounding formations and then hardening to retain the casing rigidly in position. Perhaps of even greater importance is the fact that the cement also seals off the hydrocarbon bearing strata from the other formations so that when the casing and cement are subsequently perforated, the hydrocarbons enter directly into the casing and migration of fluids between adjacent formations is prevented.

Therefore, it is important to the proper completion of a well to have precise information concerning the nature of the cement annulus surrounding the casing. In U.S. Letters Patet Nos. 3,291,247 and 3,291,248, granted Dec. 13, 1966, in the names of Majani and Rushton, and U.S. Letters Patent No. 3,292,146, granted Dec. 13, 1966, in the name of John T. Dewan, all assigned to the present assignee or an affiliated company, there are disclosed techniques and apparatus for performing an operation commonly known as cement bond logging. In accordance with these disclosures, the acoustic properties of the well casing are logged and the resultant record examined to determine the presence or absence of the bonding of the annulus of cement to the well casing along the logged length of borehole. This procedure, then, gives the operator information as to whether at any given point along the borehole, cement is firmly bonded to the casing.

The foregoing techniques, however, do not distinguish between areas in which cement is present behind the casing but not bonded to it, and those where no cement is present at all. In the former case, repair of the cement annulus may not be necessary since, although not bonded to the casing at the point in question, the cement annulus may still properly seal the formations.

It is obvious, therefore, that information as to the presence or absence of cement behind the casing is highly desirable, and it is the primary object of the present invention to provide techniques and apparatus for providing such information.

Another object of the present invention is to provide a simple yet reliable technique for determining the presence or absence of cement between a casing and the surrounding formations at any point along the borehole.

A further object of the invention is to provide a simple logging apparatus for obtaining indications of the presence or absence of cement behind the casing along a borehole.

Briefly, in accordance with the present invention, an acoustic impulse is generated at a point along the cased borehole and the energy thereof transmitted, at least in part, to a second point along the borehole. An acoustic receiver at said second point, spaced a fixed longitudinal distance from the transmitter along the borehole, intercepts the energy arriving at the second point and produces a corresponding electrical signal consisting of a plurality of alternations. To obtain an indication of the presence or absence of cement behind the casing between the transmitter and receiver, the electrical signal from the receiver is first filtered to remove unwanted frequency components and then passed to a blanking gate which is operative to select a portion thereof for further processing. Specifically, the blanking gate is timed to omit the portion of the received signal which is representative of direct compressional or shear wave transmission through the liquid, casing, cement or formation. The signal portion passed is applied to circuitry, such as an integrator, which provides a measurement of its total energy. This value is indicative of the presence or absence of cement behind the casing in the region under investigation since reverberatory energy in the liquid is more quickly dissipated when the casing is acoustically coupled to the formations by hard material such as cement in the annulus between casing and formations.

At the same time, the receiver output signal may be supplied to conventional cement bond logging circuitry, such as described in the aforementioned patents, in which the first significant alternation or amplitude excursion of the received signal is employed to provide an indication of the presence or absence of bonding of cement to the casing in the region under consideration.

As the transmitter and receiver are moved through the borehole, the transmitter is periodically pulsed, thereby producing both indications concurrently at each of a number of depth intervals. The two indications may then be simultaneously recorded as a function of depth.

A comparison of both indications at any given depth will reveal the existence of one of the following possible conditions: (1) cement is present behind the casing and is securely bonded thereto, or (2) cement is not behind the casing (and therefore not bonded thereto), or (3) cement is present behind the casing but not bonded thereto.

The foregoing and other objects, features and advantages of the present invention will become more apparent from the following more detailed description thereof, taken in conjunction with the accompanying drawings, in which.

Figures 1, 2:
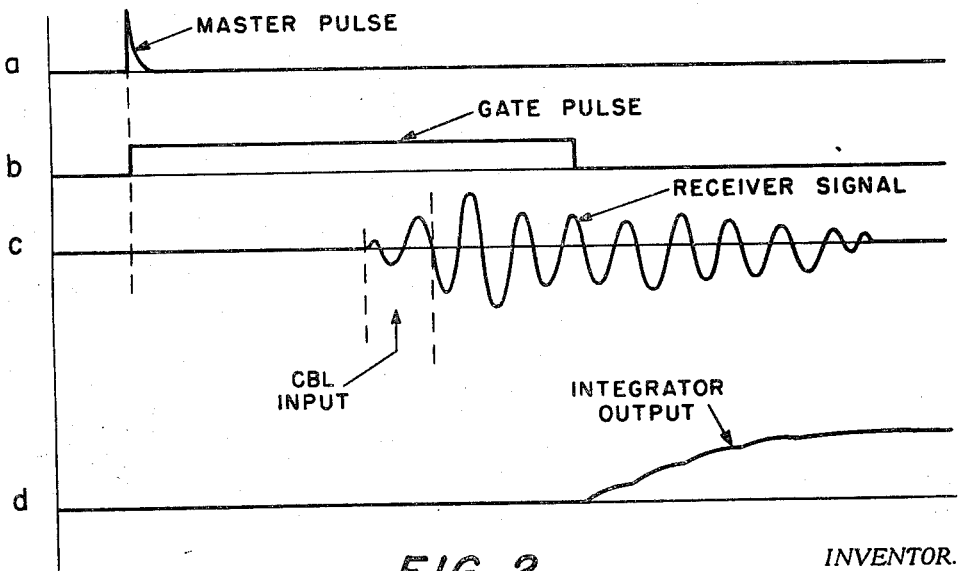
FIGURE 1 is a schematic representation of the logging system according to the invention, illustrating the logging tool in position in the borehole, with the downhole and surface circuitry shown in block form.
FIGURE 2 is a wave form diagram useful in explaining the operation of the system of FIGURE 1.

Referring now to FIGURE 1, a borehole 12 is drilled in the earth formations 10 and a casing 14, such as of steel, placed along the borehole. As described above, the cement slurry is then pumped into the annulus between the casing and the surrounding formations and subsequently hardens to form a cement annulus 16. In FIGURE 1, the cement annulus is seen to be completely bonded to the casing 14 and completely filling the annulus space between the casing and the surrounding formations 10. The casing 14 is filled with a liquid 18.

A logging tool 20 of a generally cylindrical shape is suspended in the casing 14 by means of the conventional cable 22. The latter not only provides support for the tool but also carries the electrical conductors for coupling electrical power and logging signals between the tool and the surface equipment. A suitable winch (not shown) is provided at the surface for lowering and raising the logging tool 20 in the borehole. The tool 20 is provided with centralizers 21 for maintaining it concentrically disposed within the casing.

Mounted in the tool 20 in spaced relationship to one another are an acoustic transmitting transducer 24 and a corresponding receiving transducer 26. Each of these may be of any convenient form capable, in the case of the transmitter, of converting an electrical trigger pulse into a burst of acoustic energy and, in the case of the receiver, capable of converting an intercepted acoustic signal into a corresponding electrical wave form.

To the right of the borehole cross-section shown in FIGURE 1 is a block diagram of the downhole and surface electrical circuitry of the system. It will be understood, of course, that the downhole circuitry is mounted in the logging tool 20 itself and connected via cable 22 to the surface equipment located above.

The electrical circuitry includes a master pulse generator 30 which serves as a timing source for the entire system. The pulse generator 30 provides periodic output pulses to a transmitter triggering circuit 32 in the tool which serves to actuate the acoustic transmitter 24. Thus, the transmitter emits periodic bursts of acoustic energy in response to the pulse generator 30 as the tool is moved through the well bore.

The output of the acoustic receiver 26, in the form of an electrical signal, is fed through an amplifier 34 to the cement bond logging (CBL) circuitry 36, such as of the type disclosed in the aforementioned patents, which will be discussed further hereinafter. The output of the amplifier 34 is also coupled through a filter 35, preferably of the high pass type to the gate 38 which is connected to an integrating circuit 42. The outputs of the CBL circuitry 36 and the integrator 42 are fed to a dual track recorder 44 which is driven in synchronism with the movement of the logging tool through the borehole, in a known manner.

A blanking gate 38 is controlled by a gate pulse generator 40 of any convenient form, which in turn is actuated by the master pulse generator 30. Turning to FIG. 2, the blanking gate pulse output of the pulse generator 40 is indicated in curve b and is seen to begin upon receipt of the master pulse (curve a) and end an appreciable time after the initial arrival of the acoustic energy at the receiver 26. The presence of a blanking gate pulse is effective to close the gate 38, which thereby does not pass the initial portion of the receiver signal.

The portion of the receiver signal passed by the gate 38 is fed to an integrator 42 which produces an output indication corresponding to the total energy contained in the signal supplied to it. As seen in curve d of FIG. 2, the output of the integrator builds up with each cycle of the input signal, but since this process occurs so rapidly with respect to the movement of the recorder, the indication produced thereon is effectively the total energy value and is held until the next master pulse, whereupon the integrator is instantly discharged in preparation for the next cycle.

As described in the aforementioned patents, the nature of the bond between the cement surrounding the casing and the casing may be determined by the attenuation effects on the initial portion of the receiver signal. Since the casing provides a path of known, constant velocity for acoustic energy, it is possible to accurately select the desired portion of the receiver signal and examine its amplitude characteristics in accordance with the techniques and apparatus described in the above-noted patents, which are incorporated by reference herein. Thus, if the cement is bonded to the casing in the area under investigation, the acoustic energy travelling along the casing will be greatly attenuated, and this fact can be determined by examining the amplitude of the first significant amplitude excursion of the receiver signal. On the other hand, if cement is not bonded to the casing, the acustic energy travels along the casing substantially without impediment and little attenuation results. In this case, the amplitude of the first arrival of the acoustic signal at the receiver is relatively high. It is therefore possible to distinguished between conditions of bonding and no bonding of the cement to the casing as the tool 20 moves through the borehole and the CBL circuitry 36 provides such indications.

Although accurately indicating the presence or absence of a bond between cement and the casing along the borehole, the measurements of the CBL circuitry are inadequate to establish a distinction between the mere absence of a bond (with cement present) and the absence of cement behind the casing at the point of investigation. The initial portion of the receiver signal, which represents the direct compressional wave transmission along the casing, is affected only by materials tightly bonded to the casing, and even a slight separation between the cement and the casing will produce a "no bond" indication. It has been found that information concerning the presence or absence of cement behind the casing may be determined from the energy content of that portion of the received signal other than that representing direct compressional wave transmission along the casing and, further, that the determination may be facilitated by measuring the energy only of selected frequency components. These later arriving components of the received signal representative mainly of reverberatory energy in the liquid column are affected by the presence and kind of material behind the casing, whether or not bonded to it. The observed results are explained on the basis of the following theory.

The cased borehole acts in response to acoustic energy in a manner similar to a waveguide for microwave energy. A burst of acoustic energy from the transmitter will set up various modes of propagation within the casing. The characteristics of the modes are established by the geometry of the casing and the transmitter frequency, assuming the liquid filling the casing to be uniform. The waves produced upon actuation of the transmitter tend to bounce back and forth between the walls of the casing and, for a given wave length of acoustic energy and diameter of casing, waves striking the casing at only a number of discrete angles will be sustained and propagate along the borehole. This is because incident and reflected waves interfere with each other and, unless they interfere in a coherent fashion, they will cancel themselves out.

Assuming the ideal case of a guide or casing with rigid (i.e., totally inelastic) walls, the sustained reflections set up standing waves transversely of the guide with the walls providing a pair of pressure antinodes (maxima), and the wave pattern propagates along the length of the casing with a phase velocity dependent upon the reflection angle.

In the ideal case, discussed above, the rigidity assumed for the walls prevents any energy from escaping out of the casing. In the practical case, however, the walls, i.e., the casing and the surrounding materials, exhibit a certain elasticity dependent upon the materials of which they are formed. With elastic walls, two situations of wave propagation may occur. If, in a particular propagation mode, the angle of incidence of the acoustic wave is greater than the critical angle, then total reflection occurs and no energy escapes into the surrounding materials. If the angle of incidence is less than the critical angle, the laws of refraction apply and only part of the energy is reflected back into the casing. As a result, the energy propagating along the length of the casing will be diminished at each reflection. Such a high order mode of propagation may be termed an "attenuated normal mode." By choosing the transmitter frequency and casing diameters in proper relationship, an attenuated normal mode of propagation can be established in a cased borehole. Also, by gating out the earlier arrivals including those following immediately the compressional and new arrivals, the non-attenuating lower order modes can be eliminated from the measurement.

The amount of energy in the acoustic wave lost at each reflection and refraction depends upon the character of the surrounding materials. If the annulus between the casing and the surrounding formations is empty, coupling of energy to the surrounding formations is minimized and attenuation or loss correspondingly reduced. This, of course, results in increased energy reaching the receiver. If the annulus is completely filled with cement, maximum coupling of energy to the surrounding formation occurs, providing the greatest attenuation. In this case, the amount of energy reaching the receiver is relatively low. Energy values between the two extreme conditions reflect varying amounts of cement between the casing and the formations.

It has also been found that certain frequency components of the acoustic energy propagated along the well bore respond more strikingly to the character of the surrounding formations. In order for the acoustic wave to lose appreciable amounts of energy to the surrounding formations, the phase velocity of the acoustic wave must exceed the velocity of sound in the formation. The formation is the ultimate recipient of the energy. If, then, all frequency components other than those which correspond to phase velocities above the formation velocities are deleted from the receiver output, the resultant receiver signal will more clearly reflect the effect of cement presence, i.e., the attenuation, on the acoustic wave, since the energy must pass through the cement to reach the formation.

The foregoing discussion is offered by way of theory only and is not intended to be limiting. Regardless of what may ultimately be determined to be the precise theory by which the invention may be explained, the present inventor has found a technique and apparatus for determining the condition or quality of the cement annulus between the casing in a well bore and the surrounding formations. This technique involves gating out the initial portion of the received acoustic wave corresponding to compressional wave travel along the casing. The combination of this step with the integration of the signal thereafter remaining provides an indication of energy which accurately reflects the quality of the cement annulus. The indications so obtained may be appreciably accentuated by removing from the receiver output, by means of a high pass filter, the lower frequency components of the received signal.

The output indications produced by the integrator 42 are simultaneously recorded with the output of the CBL circuitry as a function of depth to provide a pair of correlative logs. Thus, a low reading of the integrator coupled with a "bond" output of the CBL circuit would indicate the condition shown in FIGURE 3A, wherein cement fills the annulus between the casing and the formation and is bonded to the casing. A high reading from the integrator 42 coupled with a "no bond" indication from the circuitry 36 indicates the condition shown in FIGURE 3B, wherein a void 52 is present in the cement annulus.

Figure 3A:
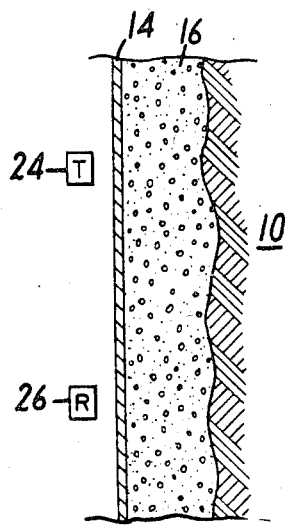
FIGURES 3A, 3B and 3C are illustrative of the possible cement conditions that may be determined with the present invention.
Figure 3B:
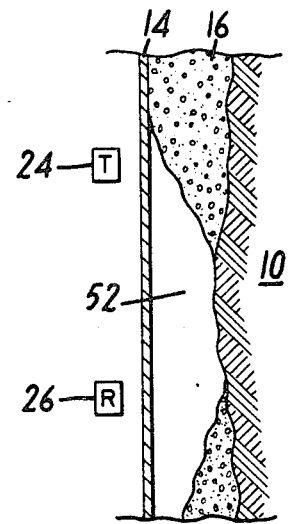
Figure 3C:
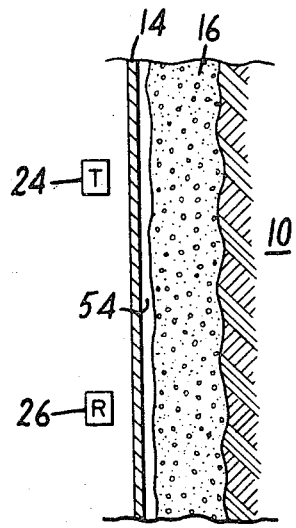

Finally, a low indication from the integrator 42 together with a "no bond" output from the CBL circuitry would result from the condition of FIGURE 3C, wherein cement is present but is not bonded to the casing 14. While a separation 54 between the cement in the casing may be present, the formations 10 are still properly sealed off by the cement 16 and repairs would not be necessary.

Although FIGURES 3A, 3B and 3C represent extremes of the cement characteristics, the output of the integrator 42, i.e., the indication of the energy content of the received signal, may be interpreted to indicate not only the presence or absence of cement, but also the amount of the cement.

Under conditions found in a typical cased borehole, it was determined that elimination of approximately the first four-tenths of the received signal eliminated the unwanted direct wave and lower order mode transmission. With a steel casing, this required a gate pulse (FIG. 2b) of approximately one millisecond in duration. These parameters, of course, will vary with the material of the casing and the character of the surrounding formations, and may be adjusted to suit the existing requirements.

With a typical acoustic transmitter providing a pulse having its primary frequency components around 25 kilocycles per second, removal of frequency components below about 15 kilocycles per second was found to significantly emphasize the desired indication. The integration is thus performed over a frequency band of about 15 to 25 kilocycles per second. This, of course, will change if the transmitter signal frequency changes.

Although a preferred embodiment of the invention has been shown and described hereinabove, it will be readily apparent that various modifications thereof may be made by those skilled in the art without departing from the spirit and scope of the invention. Accordingly, the invention is to be limited only as set forth in the appended claims.

What is claimed is:

1. A method of determining characteristics of the cement annulus between a liquid filled casing in a borehole and the surrounding earth formations, comprising the steps of generating a pulse of acoustic energy at a first point within said borehole and said casing and transmitting at least a portion of said energy having substantial compressional and reverberatory components to a second point within said borehole longitudinally spaced from said first point, intercepting the acoustic energy arriving at said second point and producing an electrical signal representative thereof, and measuring mainly the energy of that portion of said electrical signal representative of said reverberatory energy component in the liquid column to provide an indication of the presence or absence and amount of cement behind the casing between said first and second points.

2. A method of determining characteristics of the cement annulus between a liquid filled casing in a borehole and the surrounding earth formations, comprising the steps of generating a pulse of acoustic energy at a first point within said borehole and said casing and transmitting at least a portion of said energy to a second point within said borehole longitudinally spaced from said first point, intercepting the acoustic energy arriving at said second point and producing an electrical signal representative thereof, and measuring mainly the energy of selected frequency components of that portion of said electrical signal representative of reverberatory energy in the liquid column to provide an indication of the presence or absence and amount of cement behind the casing between said first and second points.

3. A method of determining characteristics of a cement annulus between a liquid filled casing in a borehole and the surrounding earth formations, comprising the steps of generating a pulse of acoustic energy at a first point within said borehole and transmitting at least a portion of said energy having a substantial compressional wave component within said borehole, intercepting the acoustic energy transmitted within said borehole at a second point longitudinally spaced from said first point and producing an electrical signal representative thereof, deleting the initial portion of said signal representative of compressional wave transmission along said casing, and measuring the energy in the remainder of said signal, low and high values thereof respectively indicating the presence and absence and amount of cement behind the casing between said transmitting point and receiving location.

4. The method of claim 3 above, further comprising the step of selecting a band of frequency components of said electrical signal adjacent the primary frequency component of said electrical signal, whereby said measured energy is that of said selected frequency band in said remainder of said signal.

5. A method of determining characteristics of a cement annulus between a liquid filled casing in a borehole and the surrounding earth formations, comprising the steps of periodically generating pulses of acoustic energy at respective first points at different depths within said borehole and transmitting within said borehole at least a portion of the energy of each of said pulses having a substantial compressional wave component, intercepting the respective pulses of acoustic energy transmitted at second points within said borehole and longitudinally spaced respectively from said first points, and producing electrical signals representative thereof, each of said signals being composed of a plurality of alternations, deleting the initial portions of each of said signals representative of compressional wave transmission along said casing, integrating the remainder of each of said electrical signals to provide indications of the energy therein, low and high values thereof respectively indicating the presence or absence and amount of cement behind the casing between said first and second points, and recording said indications at a function of depth in the borehole.

6. The method of claim 5 above, further comprising the step of selecting a band of frequency components of said electrical signal adjacent the primary frequency component of said electrical signal, whereby said selected frequency band in said remainder of said signal is integrated.

References Cited

UNITED STATES PATENTS

| | | | |
|---|---|---|---|
| 3,265,151 | 8/1966 | Anderson | 181—5 |
| 3,308,426 | 3/1967 | Wilson | 181—5 |
| 3,314,498 | 4/1967 | Anderson et al. | 181—5 |
| 3,339,666 | 9/1967 | McDonald | 340—18 X |

BENJAMIN A. BORCHELT, *Primary Examiner.*

JAMES FOX, *Assistant Examiner.*